United States Patent [19]

Suzuki et al.

[11] 4,001,842

[45] Jan. 4, 1977

[54] APPARATUS FOR MAKING ELECTRO-LUMINESCENT SCREENS FOR COLOR CATHODE-RAY TUBES OF CONTINUOUS PHOSPHOR STRIPES

[75] Inventors: Takeshi Suzuki; Hiroshi Tanaka, both of Fukaya; Masanori Akiyama, Honja, all of Japan

[73] Assignee: Tokyo Shibaura Electric Co., Ltd., Kawasaki, Japan

[22] Filed: May 5, 1975

[21] Appl. No.: 574,639

Related U.S. Application Data

[62] Division of Ser. No. 386,317, Aug. 7, 1973, Pat. No. 3,890,151.

[30] Foreign Application Priority Data

Aug. 7, 1973 Japan .............................. 48-78420

[52] U.S. Cl. .................................................. 354/1
[51] Int. Cl.² .......................................... G03B 41/00
[58] Field of Search ....................... 354/1; 96/36.10

[56] References Cited

UNITED STATES PATENTS 3,760,698 9/1973 Fujimura .............................. 354/1

*Primary Examiner*—John Gonzales
*Attorney, Agent, or Firm*—Schuyler, Birch, Swindler, McKie & Beckett

[57] ABSTRACT

An electroluminescent screen comprising a plurality of continuous phosphor stripes running the length of the screen formed on a panel for a color cathode-ray tube by applying film containing photosensitive material onto the panel. A shadow mask is attached to the panel, and the mask and film are irradiated by light from a light source.

The shadow mask has on its concave face which faces the light source apertures arranged in substantially parallel rows, the apertures along the length of each of the rows being separated from each other by thin beam-intercepting bridge portions. The area on the shadow mask irradiated by the light is limited to cover only a part of the length of the rows of apertures by a shield plate having an opening for limiting the path of the light.

The shield plate is moved so as to move the irradiated area on the shadow mask along the length of the rows of the apertures. The light source has sufficient length in the lengthwise direction of the rows of apertures to produce on the film the bright image of the apertures, each image being expanded to be connected with the adjacent bright images of the apertures on either side along the length of the row. The light source is gradually inclined synchronously with the moving of the irradiated area on the shadow mask, to always be kept substantially parallel to the rows of apertures in the irradiated area.

10 Claims, 10 Drawing Figures

APPARATUS FOR MAKING ELECTRO-LUMINESCENT SCREENS FOR COLOR CATHODE-RAY TUBES OF CONTINUOUS PHOSPHOR STRIPES

This is a division of application Ser. No. 386,317, filed Aug. 7, 1973, now U.S. Pat. No. 3,890,151.

BACKGROUND OF THE INVENTION

This invention relates to the manufacture of electroluminescent screens for color cathode-ray tubes, in particular to the exposure of panels for the color cathode-ray tubes, for making electroluminescent screens thereon.

DESCRIPTION OF PRIOR ART

Conventional color cathode-ray tubes employ an electroluminescent screen consisting of circular phosphors dots surrounded by light-absorbing material, and a shadow mask having a circular aperture corresponding to each triad of the phosphor dots. These conventional color cathode-ray tubes have some difficulties such as complexity in structure and manufacture of the tubes, necessity of many attachments to tubes, and necessity of particular consideration being given to electron beam landing tolerance.

A color cathode-ray tube of a new type, called "in-line" gun type, has been developed to eliminate such difficulties. It employs an electroluminescent screen, a shadow mask and three electron guns of the following configurations. The electroluminescent screen of this new tube consists of vertical stripes of blue, green and red-emitting phosphors arranged in parallel with each other, and stripes of light-absorbing material placed between and adjoining the phosphor stripes. Each of the stripes of phosphor and light-absorbing material runs the vertical length of the screen. The shadow mask of this new tube has long, small-width apertures, for limiting the path of electron beams, arranged in rows corresponding to the phosphor stripes of the screen. The apertures on each of the rows are separated from each other by a bridge portion to maintain the mechanical strength of the mask. The three electron guns of this new tube are placed horizontally adjacent in a so-called in-line configuration.

This newly developed color cathode-ray tube, however, has some disadvantages. The electroluminescent screen of this new tube is made by a well-known photographic method, using photosensitive resin on the surface of the panel for the tube, the above mentioned shadow mask having long apertures, and a light source for projecting bright images of the apertures of the shadow mask onto the surface of the panel. Though there are bridge portions at which the light beam is intercepted in the row of apertures, the phosphor stripe which is to be formed on the panel surface by the bright image of the apertures must be continuous throughout the vertical length of the screen. By using a long light source elongated parallel to the aperture row, a continuous stripelike bright image corresponding to the whole length of the row is acquired: the dark image of the bridge portion which is projected on the panel by the light beam from an end of the light source is overlapped by a bright image of the light beam coming through the aperture made from another end of the light source. In rectangular color cathode-ray tubes, the strips of bright images of apertures produced on the panel as above are sufficiently straight and uniform in width on and near the vertical and horizontal axes of the panel face. But, in the corner regions of the panel face, the stripes of bright image become considerably zigzagged and ununiform in width. Consequently, phosphor stripes in the corner regions are zigzagged and ununiform in width, resulting in a decrease in quality of picture produced by the screen.

We have found that the zigzag form of the stripe images produced on the corner regions of the panel is due to the angular difference between the face of the shadow mask in the lengthwise direction of the aperture rows and the light source. As a result, we have improved the method of manufacture of electroluminescent screens for the tubes, using an improved manufacturing apparatus to obtain cathode-ray tubes of better quality.

SUMMARY OF THE INVENTION

According to this invention, in-line type tri-color cathode-ray tubes of highly improved characteristics can be obtained, the electroluminescent screen having very straight phosphor stripes, electron beam landing tolerance being very small over the whole area of the screen, adjustment of the tube being simple and easy, and the picture produced by the screen being clear and of high quality both in colors and whiteness.

Accordingly, an object of this invention is to provide an improved method of making electroluminescent screens for color cathode-ray tubes of the in-line type in which there is substantially no zigzag form of phosphor stripes.

Another object of this invention is to provide apparatus for making such electroluminescent screens.

These and other objects are accomplished by providing a n electroluminescent screen comprising a plurality of continuous phospher stripes running the length of the screen formed on a panel for a color cathode-ray tube by applying film containing photosensitive material onto the panel. A shadow mask is attached to the panel and the mask and film are irradiated by light from a light source.

The shadow mask has on its concave face which faces the light source apertures arranged in substantially parallel rows, the apertures along the length of each of the rows being separated from each other by thin-beam-intercepting bridge portions. The area on the shadow mask irradiated by the light is limited to cover only a part of the length of the rows of apertures by a shield plate having an opening for limiting the path of the light.

The shield plate is moved so as to move the irradiated area on the shadow mask along the length of the rows of the apertures. The light source has sufficient length in the lengthwise direction of the rows of apertures to produce on the film the bright image of the apertures, each image being expanded to be connected with the adjacent bright images of the apertures on either side along the length of the row. The light source is gradually inclined synchronously with the moving of the irradiated area on the shadow mask, to always be kept substantially parallel to the rows of apertures in the irradiated area.

BRIEF DESCRIPTION OF THE DRAWINGS

The above objects, features and advantages of this invention will be apparent from the following description taken in connection with the accompanying drawings wherein.

DETAILED DESCRIPTION OF THE INVENTION

Figure 1:
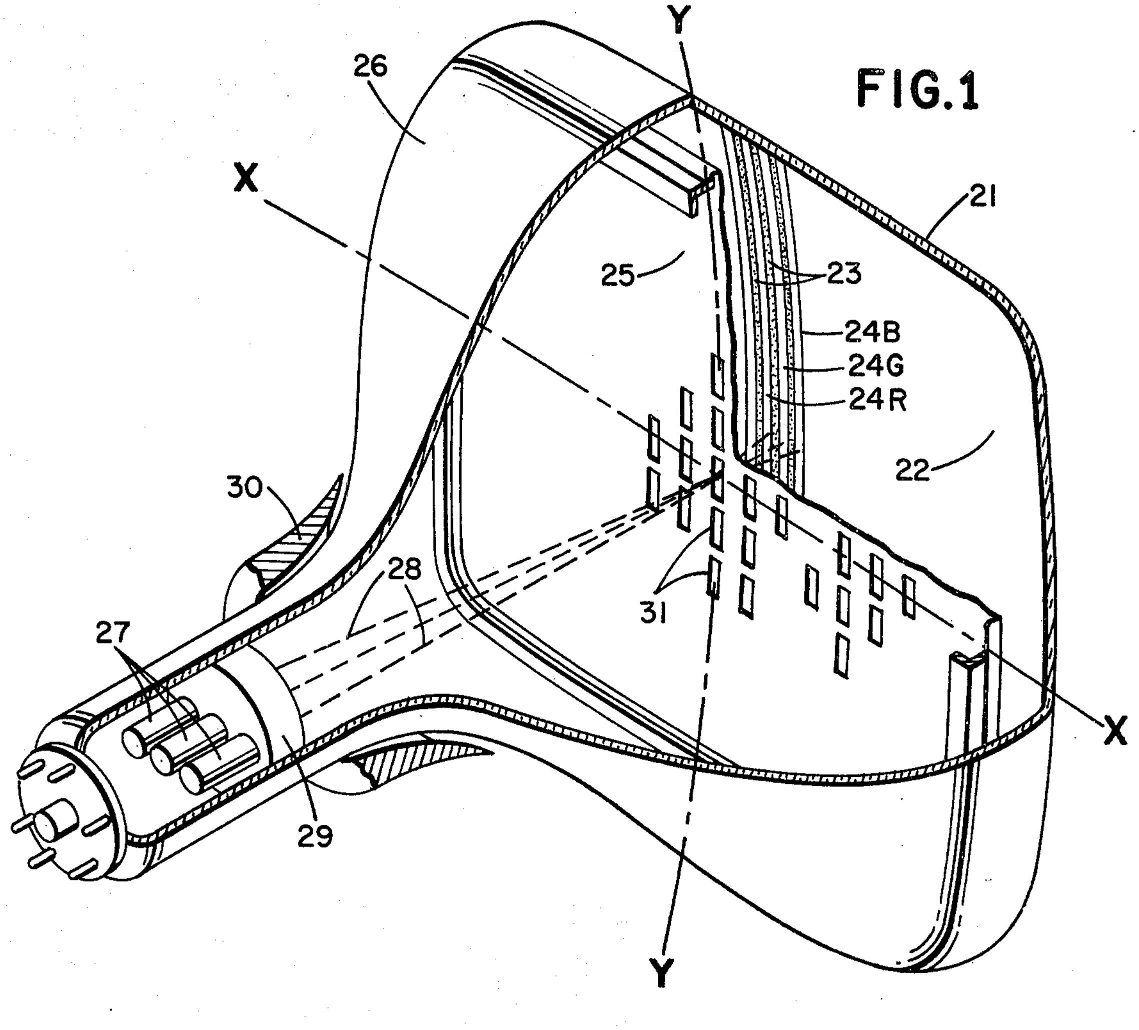
FIG. 1 is a perspective view of a color cathode-ray tube employing an electroluminescent screen made according to the invention.
Figure 2:
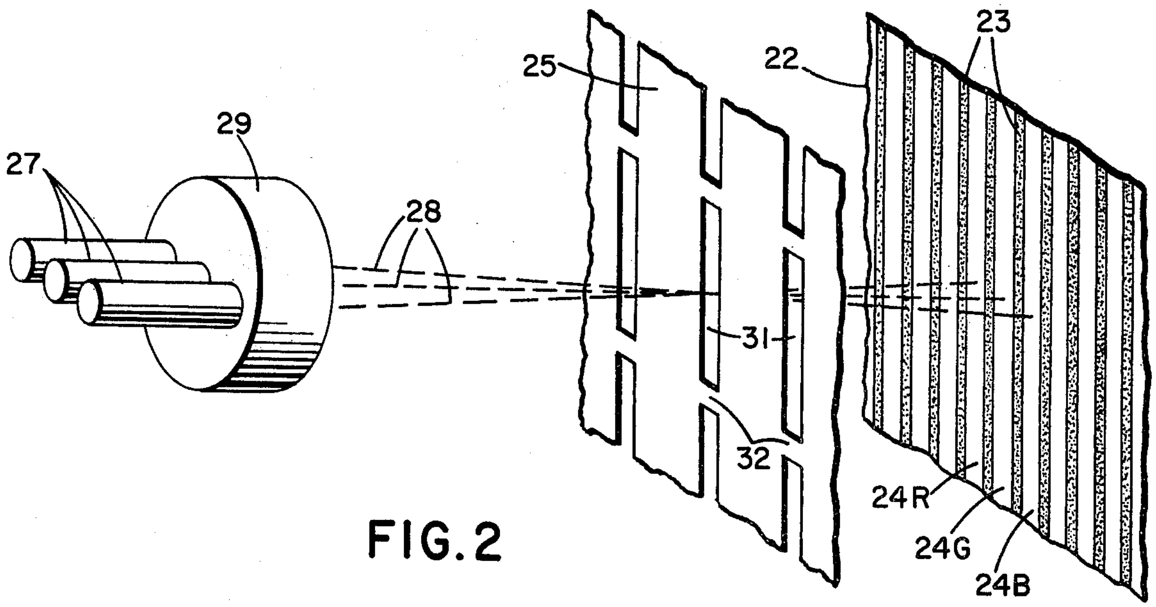
FIG. 2 is a fragmentary perspective view of the electroluminescent screen, the shadow mask and the electron guns of the tube of FIG. 1.

FIG. 1 and FIG. 2 show a tri-color cathode-ray tube of in-line gun type. A rectangular-shaped glass panel 21 has, on the inner concave surface of its face plate, an electroluminescent screen 22 consisting of alternating light-absorbing stripes 23 and elemental phosphor stripes 24R, 24G, 24B, as will be described in particular hereinafter, arranged in parallel to the vertical or Y axis of the face plate. A shadow mask 25 of a shape substantially corresponding to the panel is fixed face to face with the concave surface thereof inside the panel 21. The panel 21 is fixed to a glass funnel 26 to construct an evacuated envelope for the tube. The funnel 26 has, in its neck portion, three electron guns 27 for emitting three electron beams 28 toward the screen 22, aligned side by side in a plane containing the X axis of the panel. A means 29 for converging the electron beams is placed ahead of the guns 27. A means 30 for deflecting the electron means is attached around of portion of the funnel 26.

The shadow mask 25 has, looking at its concave face from the guns 27, a number of long, small-width apertures 31 for limiting the path of electron beams. These apertures 31 are arranged in rows parallel to the vertical or Y axis of the face. The apertures 31 in each of the rows are aligned lengthwise, as if a very long opening of the same width as that of the aperture is divided into many apertures by narrow bridge portions 32 of about 1 mm in width, for example.

Figure 3:
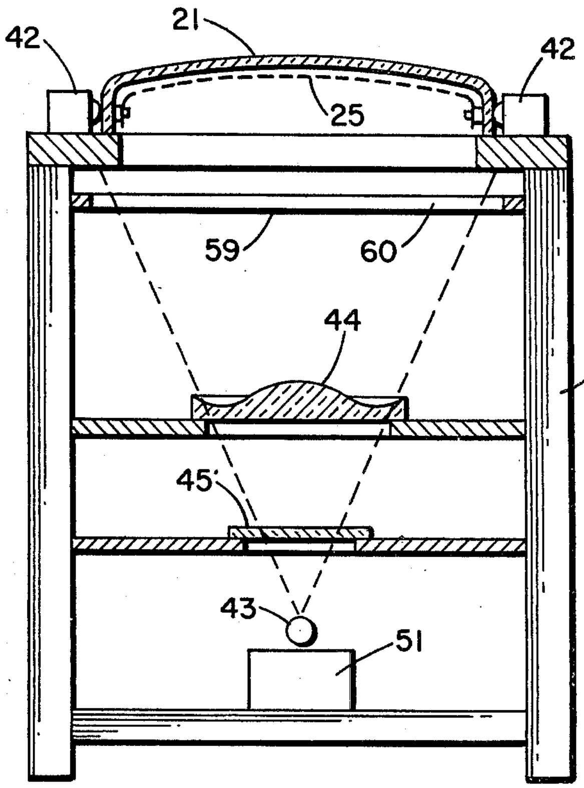
FIG. 3 is a schematic elevational view, partially in section, of an exposing apparatus according to the invention, and a panel of a color cathode-ray tube set up thereon.

To make an electroluminescent screen, the panel 21 with the shadow mask 25 attached thereon is placed with its inner surface downward on the top of an exposing box 41 in a position determined by stoppers 42, as shown in FIG. 3. On the bottom of the box 41, there is provided a light source assembly 43 for projecting light onto the inner surface of the panel 21 through the shadow mask 25. Between the light source assembly 43 and the panel 21 there is provided a lens 44 for correcting the path of the light beam from the light source assembly 43. A filter 45 for correcting distribution of the light in co-operation with the lens 44 may be provided, if desired.

Figure 5:
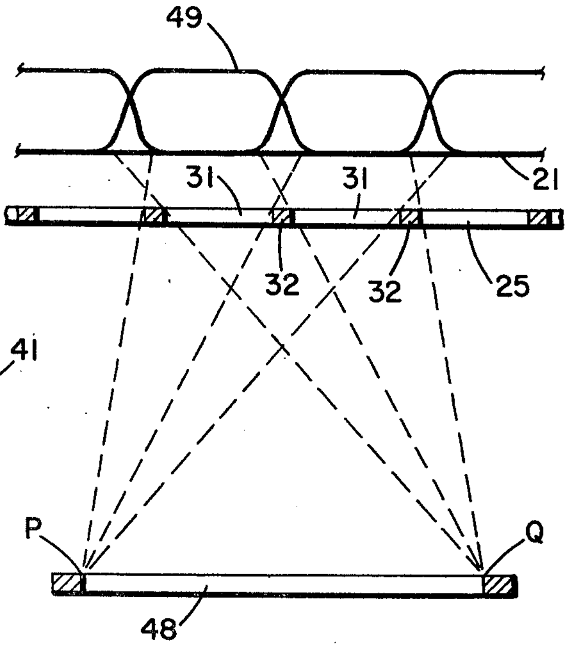
FIG. 5 is a schematic elevational view of part of the apparatus of FIG. 3, showing a shadow mask, a long light source, and a graph showing the distribution of the energy of the light.
Figure 4:
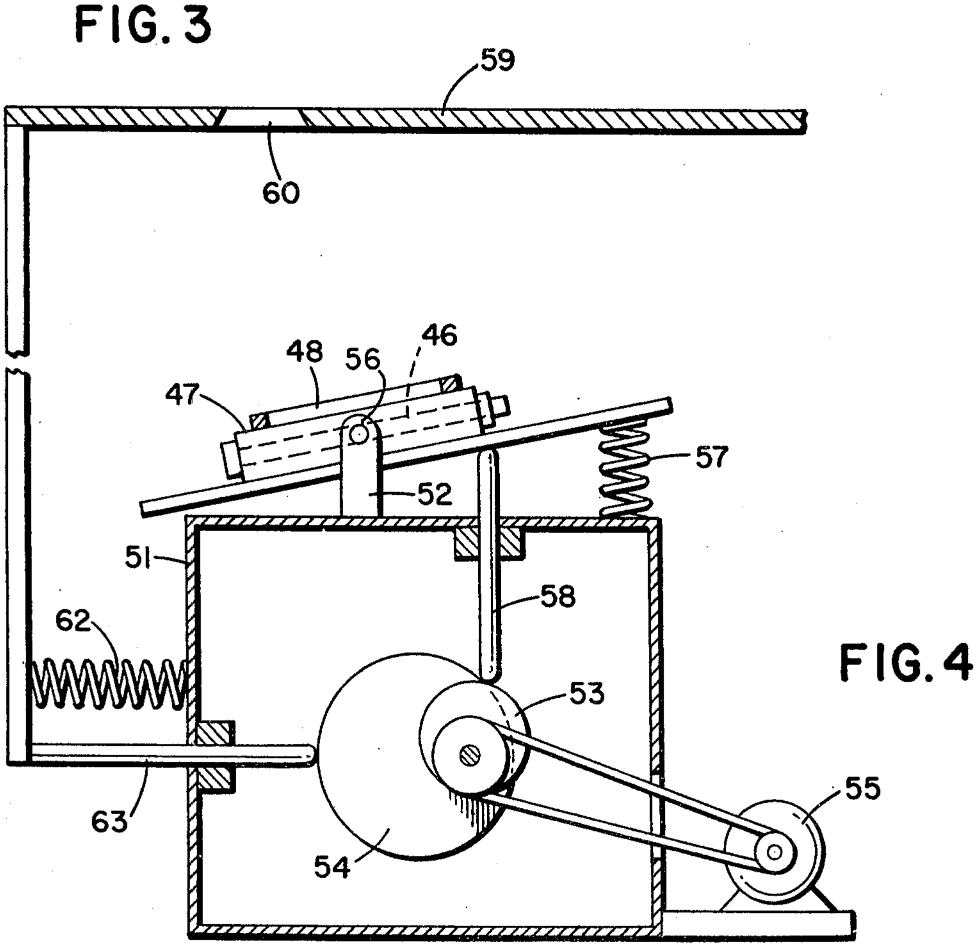
FIG. 4 is an elevational view of a light source and the attached mechanism of the apparatus of FIG. 3.

The light source assembly 43 has, as shown in FIG. 4, a lamp such as a mercury lamp 46 enclosed in a lamp house 47 which has a long, narrow window 48 in its top for the adjustment of the path of light projected from the lamp 46 toward the top of the box 41. The window 48 has a sufficient length parallel to the row of apertures 31 of the shadow mask 25, so that the dark images of the bridge portions 32 appearing on the panel 21 due to the light projected through an end of the window 48 are overlapped by the neighbouring bright images of the apertures 31 made by a light projected through another end of the window, a continuous stripe-like bright image of uniform light intensity being obtained, as shown in FIG. 5.

Lines 49 show the distribution of intensity of light on the panel 21 produced by the light from lamp 48. Thus a straight and continuous stripe-like bright image of a length corresponding to the length of the row of apertures of the shadow mask and a substantially uniform intensity of light is obtained on the panel. The window 48 of the lamp house is preferably of a long slit-shape, but may be of any other shape which can produce such a continuous stripe-like bright image as described above.

The lamp house 47 is rotatably supported on a housing 51 by a pair of supports 52. In the housing 51, there are provided cams 53, 54 rotated by a motor 55. The lamp house 47 is swingingly rotated around a supporting axis 56, in a plane containing the longitudinal axis of the window 48 and substantially perpendicular to the shadow mask, by a spring 57 and connection rod 58 which is driven by the cam 53.

Figure 6:
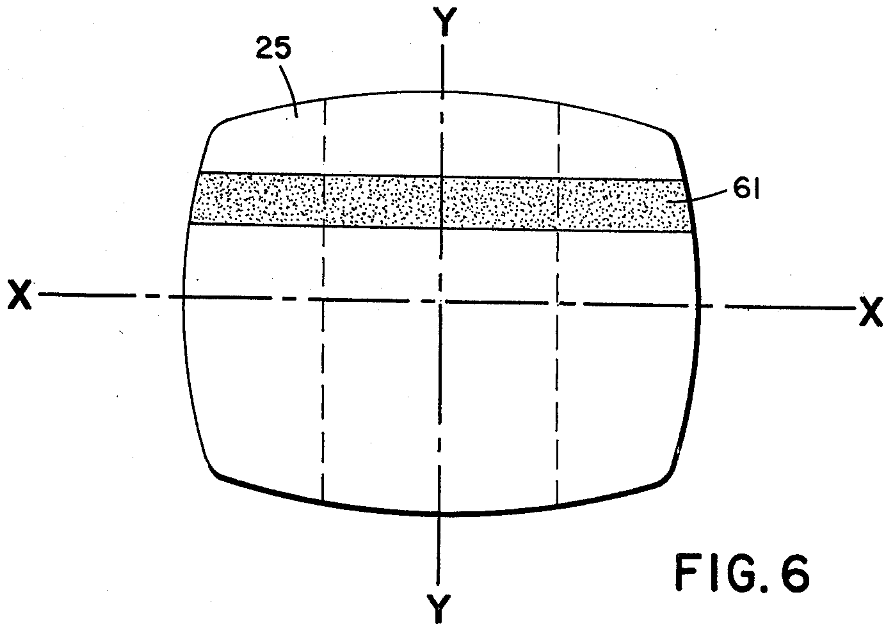
FIG. 6 is a plan diagram illustrating the irradiated area on the shadow mask according to the invention.

Above the lamp house 47, there is provided a shield plate 59 which has a long and narrow slit-like opening 60, the longitudinal axis of which is perpendicular to the longitudinal axis of the window 48, that is, parallel to the X axis of the shadow mask 25. The shield plate 59 serves to limit the path of the light from the lamp 46 so that an area 61 on the shadow mask 25 irradiated by the light which comes from the window 48 through the opening 60 may have a predetermined limited length in the Y axis direction of the shadow mask 25 so as to cover only a portion of the length of the mask 25, as shown in FIG. 6. The irradiated area 61 of the mask 25 has a sufficient width in the direction of the X axis to cover the horizontal length (i.e. the width) of the mask. The shield plate 59 is preferably placed close to the shadow mask 25. The shield plate 59 is driven back and forth in the lengthwise direction of the window 48, that is, parallel to the Y axis of the shadow mask 25, by a spring 62 and a connection rod 63 which is driven by the cam 54.

The two cams 53, 54 rotate with a definite mutual relation, and the lamp house 47 slantingly rotates in a definite relation with the movement of the shield plate 59. A suitable speed adjusting means may be applied, between the motor 55 and the cams 53, 54, for instance, to vary the rotating speed of the lamp house 47 and the moving speed of the shield plate 59.

With the movement of the shield plate 59, the irradiated area 61 on the shadow mask 25 moves in the Y axis direction, and, at the same time, the lamp house 47 rotates to vary gradually its slant angle so that the window 48 can be always kept substantially parallel to the Y axis direction slant of the shadow mask in the light irradiated area 61.

Figure 7:
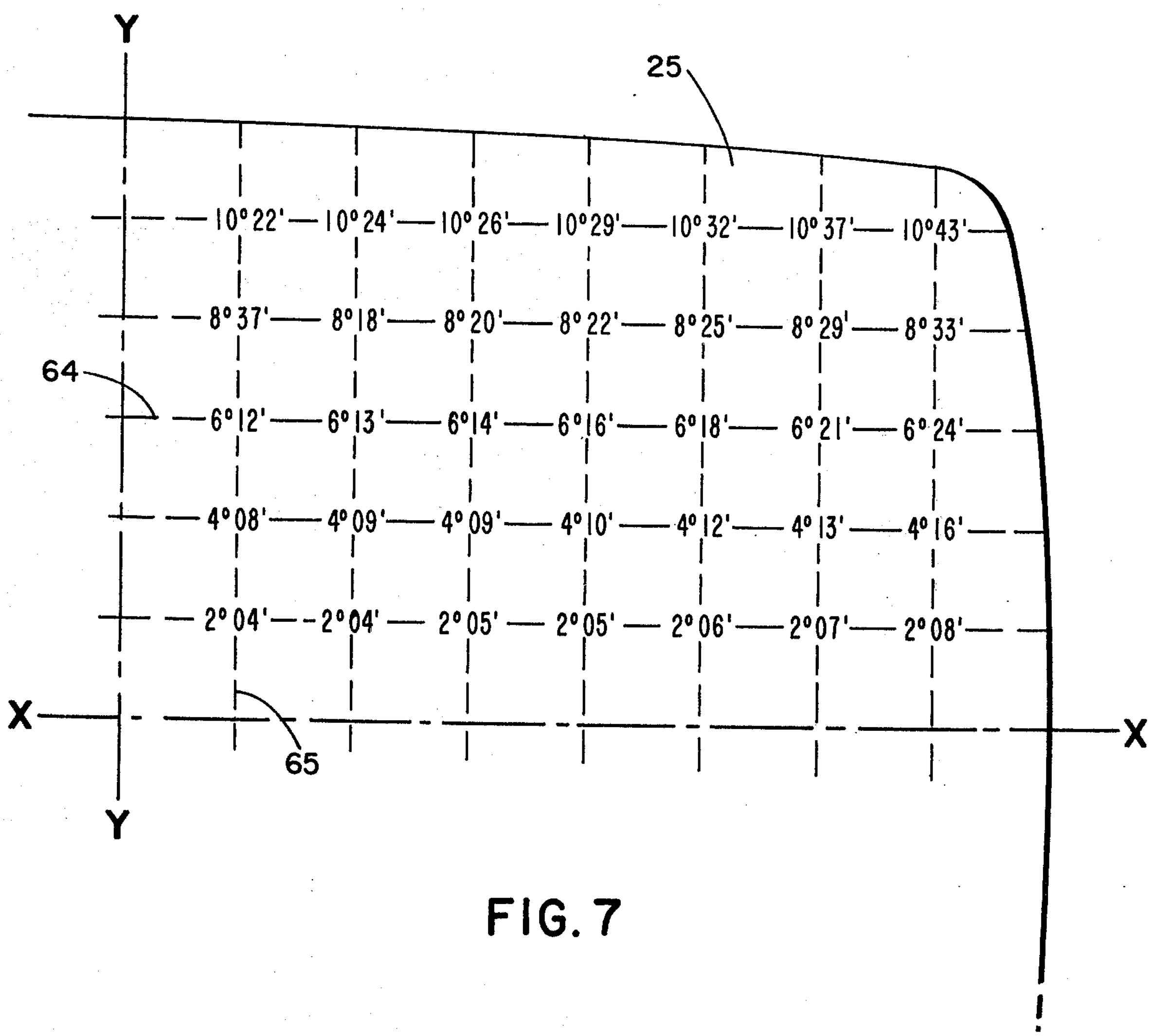
FIG. 7 is a diagram illustrating the curvature of a shadow mask.

FIG. 7 shows a quarter of the concave surface, limited by the X and Y axes, of a shadow mask widely used for color cathode-ray tubes. Figures at cross points of equal-interval horizontal lines 64 and vertical lines 65 show slant angles in the Y axis direction of the mask surface with the X–Y plane at the cross points respectively. Shadow masks are formed symmetrically with respect to the X and Y axes. As taught by FIG. 7, the slant angle on each horizontal line of the mask is substantially uniform. Accordingly, the lamp house 47 which is inclined at the slant angle at one of the cross points will be substantially parallel to the mask surface all along the horizontal line which contains said cross point.

The exposure of the panel is obtained by moving the shield plate 59 along as the lamp house 47 rotates, the irradiated area 61 on the shadow mask 25 moving over the full length of the mask in its Y axis direction. When the shadow mask is very large, or when the shadow mask has a substantial curvature in the X axis direction, the exposure may be done with good effect by dividing the whole area of the mask 25 into several sections as shown by broken lines parallel to the Y axis in FIG. 6, and irradiating the respective sections in succession.

An electroluminescent screen on the panel is made by the following process using the above described apparatus.

Figure 8:
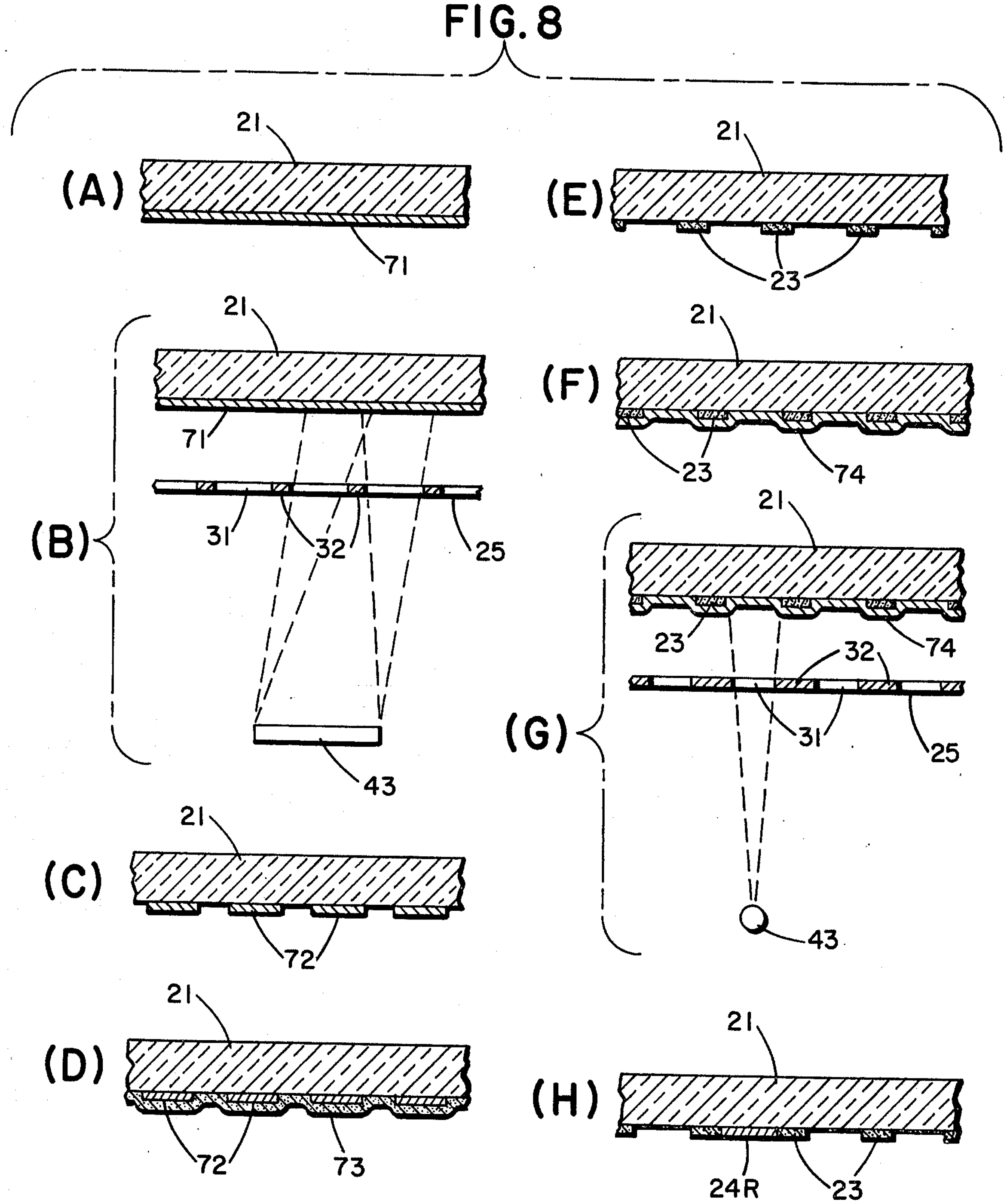
FIG. 8 comprises fragmentary views explaining the process of manufacturing the electroluminescent screen according to the invention.

A photosensitive resin film 71 consisting, for example, of polyvinyl alchohol activated with dichromate (hereinafter called PVA) is applied to the inner surface of a panel 21 as shown by FIG. 8 (A).

Then, a shadow mask 25 is attached to the panel 21, and this panel-mask assembly is set on the exposing box to expose the panel surface to the light through the shadow mask 25, as shown by FIG. 8 (B). The exposure is done three times: first with the light source located at a first position corresponding to blue-emitting phosphor stripes; secondly, with the light source at a second position corresponding to green-emitting stripes; and thirdly with the light source at a third position corresponding to red-emitting stripes.

Then, the panel 21 is removed from the shadow mask and is treated with developing solution to form PVA stripes 72 as shown by FIG. 8 (C). All of these stripes 72 are continuous, straight and uniform in width throughout the whole predetermined length of the panel in the Y axis direction.

Then, a film of light-absorbing material such as carbon 73 is applied to the surface of the panel 21 as shown by FIG. 8 (D).

Then, after dissolving the PVA stripes 72 underlying the film 73 with a solution such as peroxide water, the light-absorbing material which overlies the PVA stripes 72 is removed together with the PVA stripes by hot water spraying, so that only light-absorbing stripes 23 remain on the panel 21 as shown by FIG. 8 (E). All of these stripes 23 are continuous, straight and uniform in width throughout the whole predetermined length of the panel in the Y axis direction.

The light-absorbing stripes having been made as above, then the phosphor stripes are made according to the following steps.

A film of phosphor slurry consisting of dichromate-activated PVA solution and red-emitting phosphor powder 74 is applied to the inner surface of the panel 21 as shown by FIG. 8 (F).

Then, after attaching the shadow mask 25 to the panel, the panel 21 is exposed to the light by the use of the described exposing apparatus with the light source so located as to irradiated the gap portions between the light-absorbing stripes 23 at every third interval as shown by FIG. 8 (G). The projected light must cover the full width of each gap.

Then, after removed from the shadow mask, the panel 21 is treated with developing solution to form red-emitting phosphor stripes 24R which fill the gaps between the adjacent light-absorbing stripes 23 as shown by FIG. 8 (H).

This exposure for making phosphor stripes may also be accomplished by using conventionasl exposing apparatus in place of the above mentioned apparatus, because effective phosphor stripes formed in the gaps are limited in their width by the adjoining light-absorbing stripes 23, even if the phosphor overlaps the light-absorbing stripes.

Blue-emitting phosphor stripes and green-emitting phosphor stripes are formed in the same manner as above, except that the blue-emitting stripes are made in the gaps adjacent to the gaps having the red-emitting stripes, and the green-emitting stripes are located in the gaps adjacent to the blue-emitting stripe gaps, by locating the light source at the positions corresponding to the blue and green-emitting stripes respectively.

Figure 9:
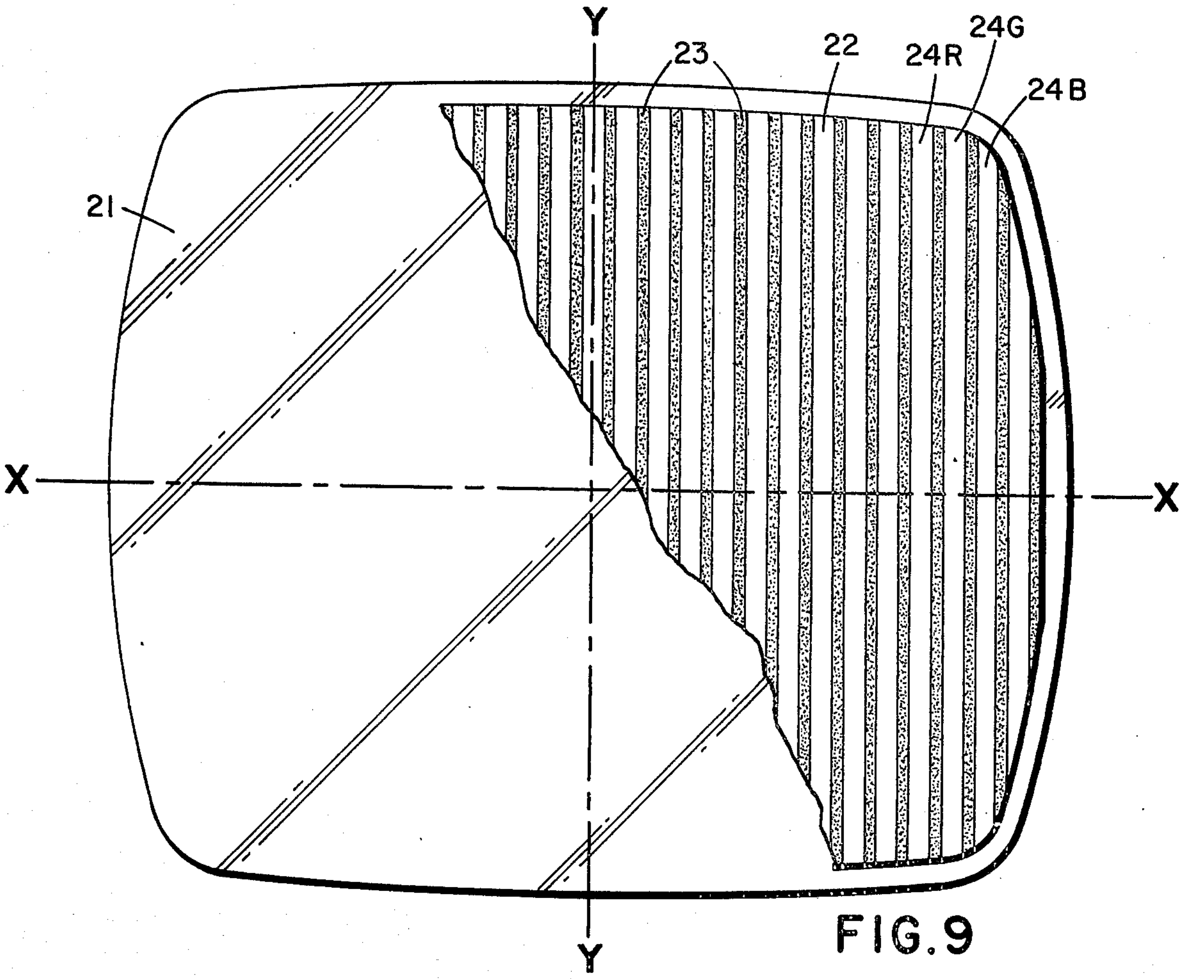
FIG. 9 is a plan view of the electroluminescent screen manufactured according to the invention.

An electroluminescent screen 22 made on the inner surface of the panel in the above described manner consists of the light-absorbing stripes 23 and the red, green and blue-emitting phosphor stripes 24R, 24G, 24B arranged in succession and filling the gaps between the light-absorbing stripes, as shown in FIG. 2. All of these stripes are straight, uniform in width and parallel over the whole area of the screen 22 as shown in FIG. 9. With the method or apparatus of the prior art, the stripes were zigzagged in the corner portions which are far from both X and Y axes.

Figure 10:
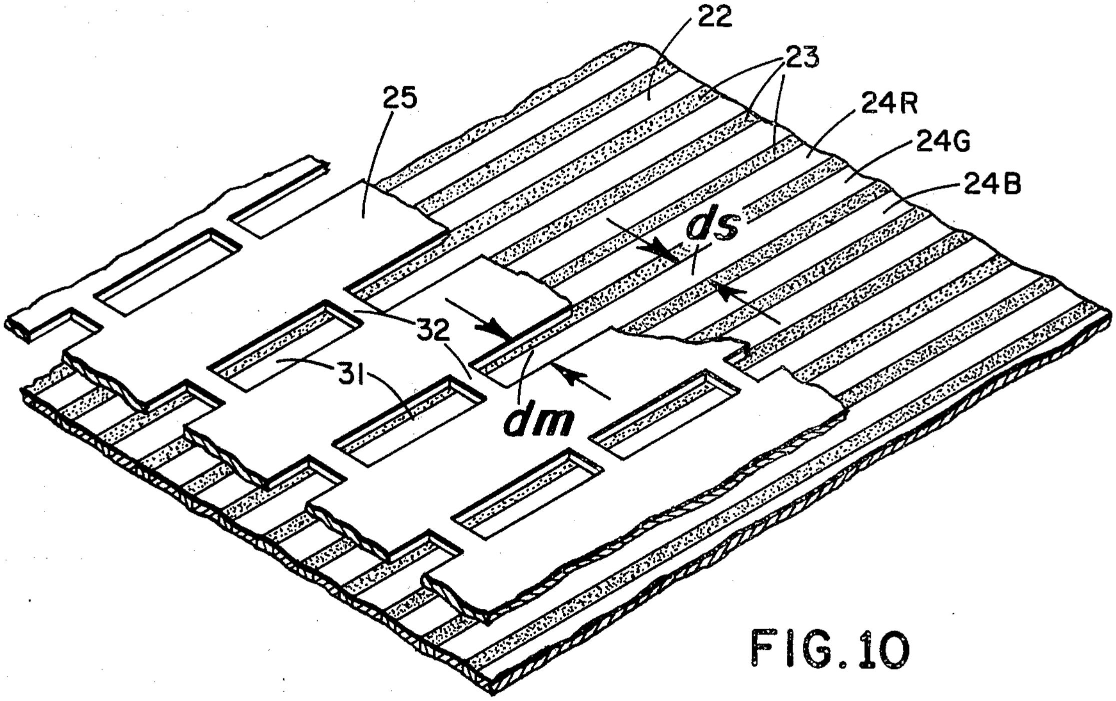
FIG. 10 is a fragmentary view of the electroluminescent screen and the shadow mask according to an embodiment of the invention.

In the above described embodiment, the light-absorbing stripes 23 are so made that the width of gap between them (ds) is smaller than the width of the aperture 31 of the shadow mask (dm), as shown in FIG. 10.

With the use of this exposing apparatus, an electroluminescent screen which consists only of phosphor stripes can also be made, the phosphor stripes of which are stright, uniform in width and continuous throughout the vertical length of the screen, by employing the above described steps for making phosphor stripes.

What is claimed is:

1. Apparatus for making an electroluminescent screen for a color cathode-ray tube comprising a plurality of separate color fields of continuous vertical stripes disposed on the viewing panel of said electroluminescent screen, each of said color fields being defined by exposing panel to light from a linear light source through a concave shadow mask attached to said panel, said shadow mask having a number of beam-passable apertures arranged in rows parallel with each other, the light projected from said light source through said mask apertures onto said panel producing a developable image on said panel, the apertures along the length of each of said rows being separated from each other by beam-intercepting bridge portions, comprising;

a. means for locating said light source at a predetermined position on the opposite side of said shadow mask for irradiating said shadow mask and projecting light from said source on an area of said panel in a pattern comprising images defined by the apertures of said shadow mask, said light source having a sufficient effective length in the lengthwise direction of the rows of the apertures to produce on said panel an image of each aperture so expanded in the lengthwise direction of the rows of the apertures as to overlap the image of each adjacent aperture in the lengthwise direction of each of the rows;

b. means for limiting the irradiated area on the shadow mask to a length covering a portion of the length of the rows of the apertures, the apertures within said lighted area having a nearly equal angle of inclination with respect to the vertical axis of said screen;

c. means cooperating with said limiting means for moving said irradiated area on the shadow mask along the length of the rows of the apertures; and, d. means for controlling the inclination of said light source to keep the longitudinal axis thereof substantially parallel to a line drawn tangent to the shadow mask apertures in the irradiated area.

2. An apparatus according to claim 1 wherein said means for limiting the length of the irradiated area on the shadow mask includes means for defining the width of the irradiated area to cover all of the number of the rows of apertures.

3. An apparatus according to claim 1 wherein said means for limiting the irradiated area on the shadow mask includes means for limiting the width of the irradiated area to a short width covering a part of the number of the rows of apertures.

4. An apparatus according to claim 1 wherein said means for limiting the irradiated area on the shadow mask comprises a shield plate located between said light source and said shadow mask and having an opening for limiting the path of the light from said light source to define said irradiated area.

5. An apparatus according to claim 2 wherein said means for limiting the irradiated area on the shadow mask comprises a shield plate located between said light source and said shadow mask and having an opening for limiting the path of the light from said light source to define said irradiated area.

6. An apparatus according to claim 3 wherein said means for limiting the irradiated area on the shadow mask comprises a shield plate located between said light source and said shadow mask and having an opening for limiting the path of the light from said light source to define said irradiated area.

7. An apparatus according to claim 1 including means interconnecting said means for moving the irradiated area and said means for inclining the light source to change the inclination of said light source synchronously with the movement of said irradiated area on said mask.

8. An apparatus according to claim 4 including means interconnecting said means for moving the irradiated area and said means for inclining the light source to change the inclination of said light source synchronously with the movement of said irradiated area on said mask.

9. An apparatus according to claim 5 including means interconnecting said means for moving the irradiated area and said means for inclining the light source to change the inclination of said light source synchronously with the movement of said irradiated area on said mask.

10. An apparatus according to claim 6 including means interconnecting said means for moving the irradiated area and said means for inclining the light source to change the inclination of said light source synchronously with the movement of said irradiated area on said mask.

* * * * *